United States Patent
Li

(10) Patent No.: US 7,408,448 B2
(45) Date of Patent: Aug. 5, 2008

(54) PARKING SENSOR APPARATUS AND METHOD TO KEEP AIR BRAKES FROM INTERFERING WITH THE PARKING SENSOR APPARATUS

(76) Inventor: Shih-Hsiung Li, 8F-1, No. 23, Sec. 1, Hangchow S. Rd., Taipei (TW)

( * ) Notice: Subject to any disclaimer, the term of this patent is extended or adjusted under 35 U.S.C. 154(b) by 141 days.

(21) Appl. No.: 11/267,747

(22) Filed: Nov. 4, 2005

(65) Prior Publication Data

US 2007/0103281 A1    May 10, 2007

(51) Int. Cl.
*B60Q 1/00* (2006.01)
*G08G 1/04* (2006.01)
*G01S 15/00* (2006.01)

(52) U.S. Cl. .................... 340/435; 340/943; 367/98
(58) Field of Classification Search ......... 340/433–438, 340/943, 501, 511, 552–554; 701/300–302; 702/85–107, 159, 171; 367/87, 89–91, 95–98; 342/68–71, 92, 93, 105
See application file for complete search history.

(56) References Cited

U.S. PATENT DOCUMENTS

| | | | | |
|---|---|---|---|---|
| 3,675,190 A | * | 7/1972 | Auer et al. ............... 367/93 |
| 4,003,049 A | * | 1/1977 | Sterzer et al. .............. 342/43 |
| 4,011,563 A | * | 3/1977 | Robbi ........................ 342/128 |
| 4,528,563 A | * | 7/1985 | Takeuchi ................... 340/903 |
| 5,076,384 A | * | 12/1991 | Wada et al. ............... 180/169 |
| 6,445,285 B1 | * | 9/2002 | Sparling ..................... 340/436 |
| 6,492,902 B2 | * | 12/2002 | Nishimoto et al. ......... 340/506 |
| 2006/0087415 A1 | * | 4/2006 | Simonazzi ................. 340/435 |

FOREIGN PATENT DOCUMENTS

JP    2001066363    3/2001

* cited by examiner

*Primary Examiner*—George A Bugg
*Assistant Examiner*—Jennifer Mehmood
(74) *Attorney, Agent, or Firm*—Alan Kamrath; Kamrath & Associates PA

(57) ABSTRACT

A parking sensor apparatus and method to keep air brakes from interfering with the parking sensor apparatus allow the parking sensor apparatus to be used with vehicles that have air brakes. The ultrasonic components of air brake noise is detected, and the alarm is bypassed when air brake noise exists. This technique reduces false alarms on vehicles with air brakes and allows the parking sensor apparatus to be used on the vehicle.

6 Claims, 5 Drawing Sheets

PARKING SENSOR APPARATUS AND METHOD TO KEEP AIR BRAKES FROM INTERFERING WITH THE PARKING SENSOR APPARATUS

BACKGROUND OF THE INVENTION

1. Field of the Invention

The present invention relates to a parking sensor apparatus and method to keep air brakes from interfering with the parking sensor apparatus and especially to a technique that prevents noise of an air brake from interfering with detecting obstacles and determining a distance to the obstacle to allow the parking sensor apparatus to be used on vehicles with air brakes.

2. Description of Related Art

Parking sensor apparatus detect an obstacle and determine a distance from the sensor to the obstacle with ultrasonic sound when backing a vehicle. The parking sensor apparatus operates on principles similar to radar but operates at ultrasonic frequencies rather than radio frequencies and comprises a controller, an ultrasonic transducer and alarm. The ultrasonic transducer transforms an electronic signal to an ultrasonic pulse, transmits the ultrasonic pulse, receives an ultrasonic echo and transforms the ultrasonic echo to an electronic signal.

With reference to FIG. 4, the ultrasonic transducer responds to a signal from the controller and a reflected echo (B) from an obstacle. With reference to FIG. 5, any reflected echo will be buried in noise generated by the release of air from air brakes on a vehicle such as a truck or bus. Noise from the air brake causes the ultrasonic transducer to saturate and generate an electronic signal indicating receipt of a high amplitude signal. Consequently, the controller activates the alarm in a false alarm situation. Any significant number of false alarms will cause a driver to lose confidence in the parking sensor apparatus. Therefore, the conventional parking sensor apparatus cannot filter or block air brake interference and produces false alarms.

Consequently, conventional parking sensor apparatus cannot be used in vehicles with air brakes. The situation can be mitigated significantly to allow a parking sensor apparatus to be used on vehicles with air brakes.

SUMMARY OF THE INVENTION

The objectives of the present invention include providing a parking sensor apparatus and method to keep air brakes from interfering with a parking sensor apparatus so the parking sensor apparatus can be used on vehicles with air brakes.

The parking sensor apparatus in accordance with the present invention comprises a microprocessor, a memory device, an ultrasonic transducer, a receiver, an analog to digital converter (ADC), an ultrasonic transmitter and an alarm device. The microprocessor controls the parking sensor apparatus and performs signal processing. The memory device is connected to the microprocessor and stores operational parameters and data. The ultrasonic transducer transmits and receives ultrasonic energy. The receiver is connected to the ultrasonic transducer and transforms energy received by the ultrasonic transducer to an analog electronic signal. The ADC is connected between the receiver and the microprocessor and converts the analog electronic signal from the receiver to a digital electronic signal that can be used and processed by the microprocessor. The ultrasonic transmitter is connected between the microprocessor and the ultrasonic transducer and causes the ultrasonic transducer to emit an ultrasonic pulse. The alarm device is connected to and driven by the microprocessor and emits an audible warning, a visual warning or both when driven by the microprocessor.

The parking sensor method in accordance with the present invention comprises the steps of activating the parking sensor apparatus, transmitting an ultrasonic pulse, monitoring for ultrasonic energy, checking any ultrasonic signal received to determine if the signal is an echo or noise and activating an alarm. Transmitting an ultrasonic pulse comprises transmitting a single short burst of ultrasonic energy from an ultrasonic transducer in a specific direction. In monitoring for an ultrasonic signal, the ultrasonic transducer receives any ultrasonic energy in the environment from a specific direction, converts the ultrasonic energy to an electronic signal and sends the electronic signal to a microprocessor for signal processing. Checking any ultrasonic signal received is performed by the microprocessor and comprises checking any ultrasonic signal's duration and amplitude to determine if the ultrasonic signal is an echo from a transmitted pulse or noise from another source. If the computer determines that the ultrasonic signal is noise, the transducer transmits another ultrasonic pulse. If the ultrasonic signal is determined to be an echo from a transmitted pulse, the microprocessor activates the alarm, and the transducer transmits another ultrasonic pulse.

With the foregoing features, this invention can keep noise from air brakes from activating the alarm so a parking sensor apparatus can be used effectively on a vehicle with air brakes.

Other objectives, advantages and novel features of the invention will become more apparent from the following detailed description when taken in conjunction with the accompanying drawings.

DETAILED DESCRIPTION OF THE PREFERRED EMBODIMENT

The present invention comprises a parking sensor apparatus and method to keep air brakes from interfering with the parking sensor apparatus so the parking sensor apparatus can be used on vehicles with air brakes.

Figure 3:
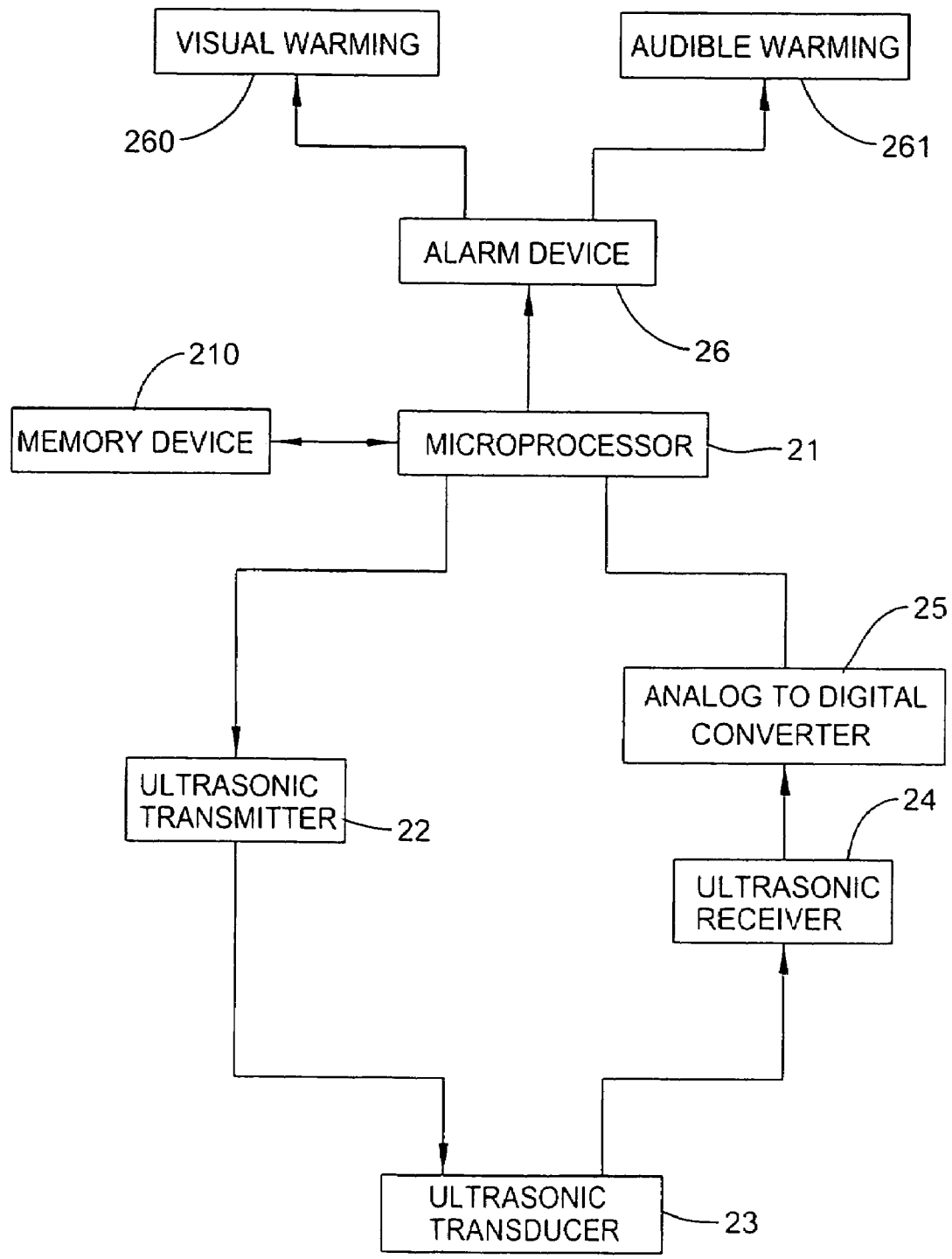
FIG. 3 is a functional block diagram of a parking sensor apparatus to keep air brakes from interfering with the parking sensor apparatus in accordance with the present invention.
Figure 4:
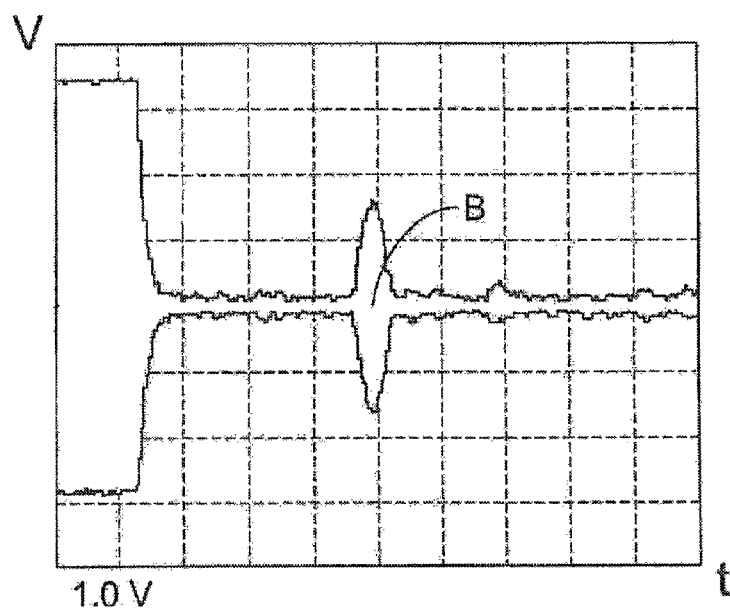
FIG. 4 is a response waveform (voltage V versus time t) of the parking sensor apparatus in FIG. 3 with an obstacle detected.
Figure 5:
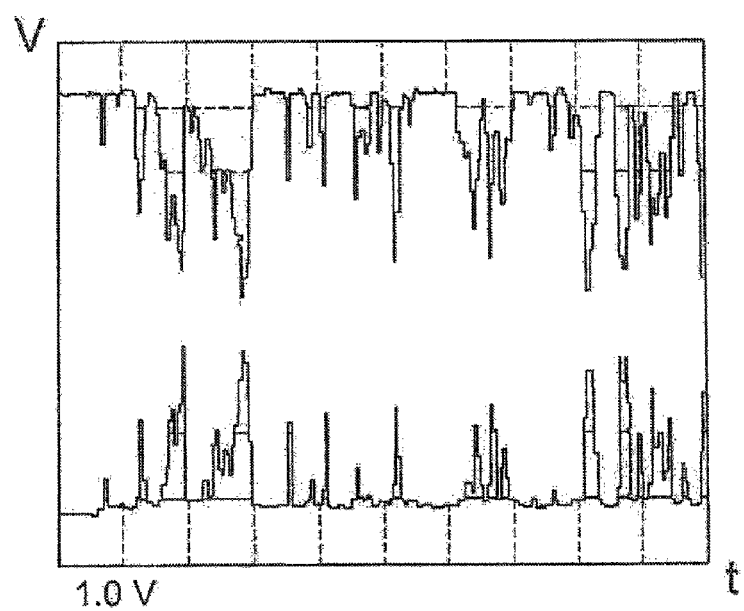
FIG. 5 is a response waveform (voltage V versus time t) of air-brake noise.
Figure 6:
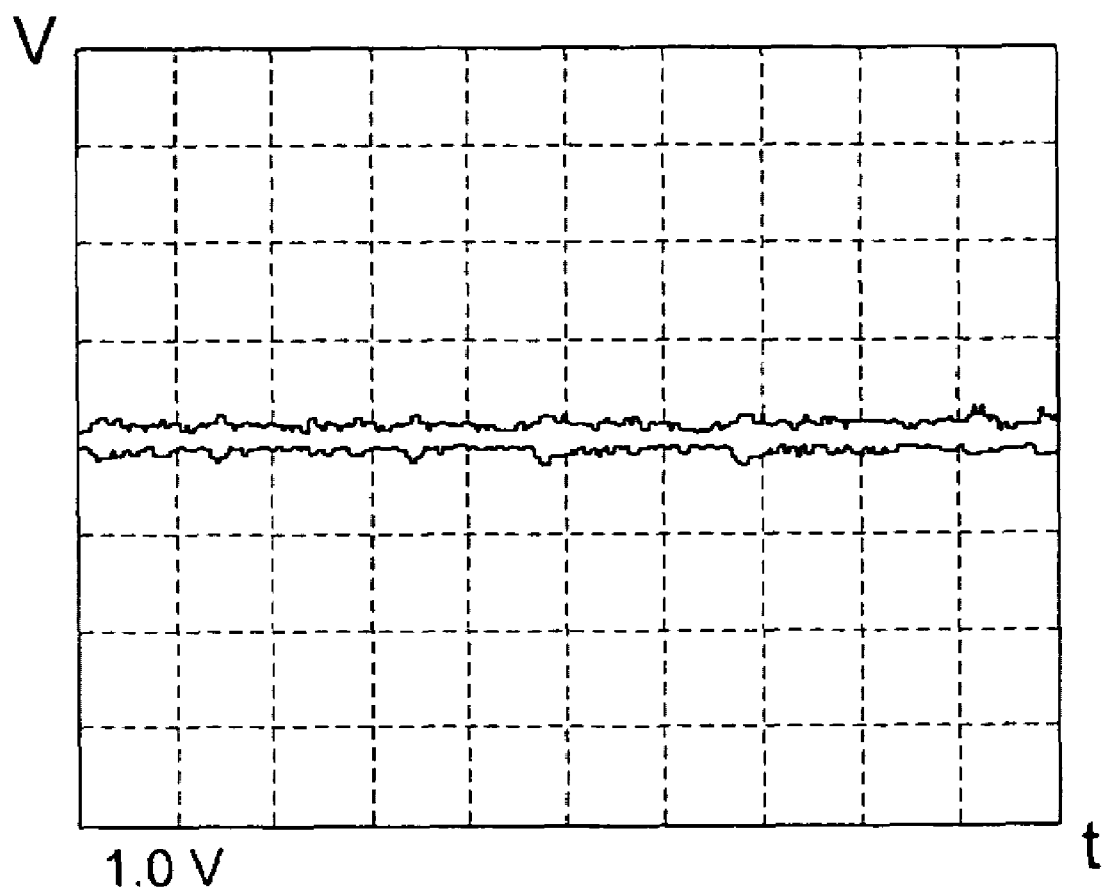
FIG. 6 is a response waveform (voltage V versus time t) of ambient ultrasonic noise in the absence of any air brake noise.

With reference to FIG. 3, the parking sensor apparatus in accordance with the present invention comprises a microprocessor (21), a memory device (210), an ultrasonic transducer (23), an ultrasonic receiver (24), an analog to digital converter (ADC) (25), an ultrasonic transmitter (22) and an alarm device (26). With further reference to FIGS. 4 and 5, the microprocessor (21) controls the parking sensor apparatus and processes signals received by the parking sensor apparatus to determine whether the signals are reflected echoes (B) or ultrasonic air brake noise. The memory device (210) is connected to the microprocessor (21) and stores operational parameters and data. The ultrasonic transducer (23) transmits and receives ultrasonic energy. The receiver (24) is connected to the ultrasonic transducer (23) and transforms energy received by the ultrasonic transducer (23) to an analog electronic signal. The ADC (25) is connected between the receiver (24) and the microprocessor (21) and converts the analog electronic signal from the receiver (24) to a digital electronic signal that can be used and processed by the microprocessor (21) to determine whether the ultrasonic energy received by the ultrasonic transducer (23) is a reflected echo (B) or ultrasonic air brake noise. The ultrasonic transmitter (22) is connected between the microprocessor (21) and the ultrasonic transducer (23) and causes the ultrasonic transducer (23) to emit an ultrasonic pulse. The alarm device (26) is connected to and driven by the microprocessor (21) and emits an audible warning (261), a visual warning (260) or both when driven by the microprocessor (21).

Figure 1:
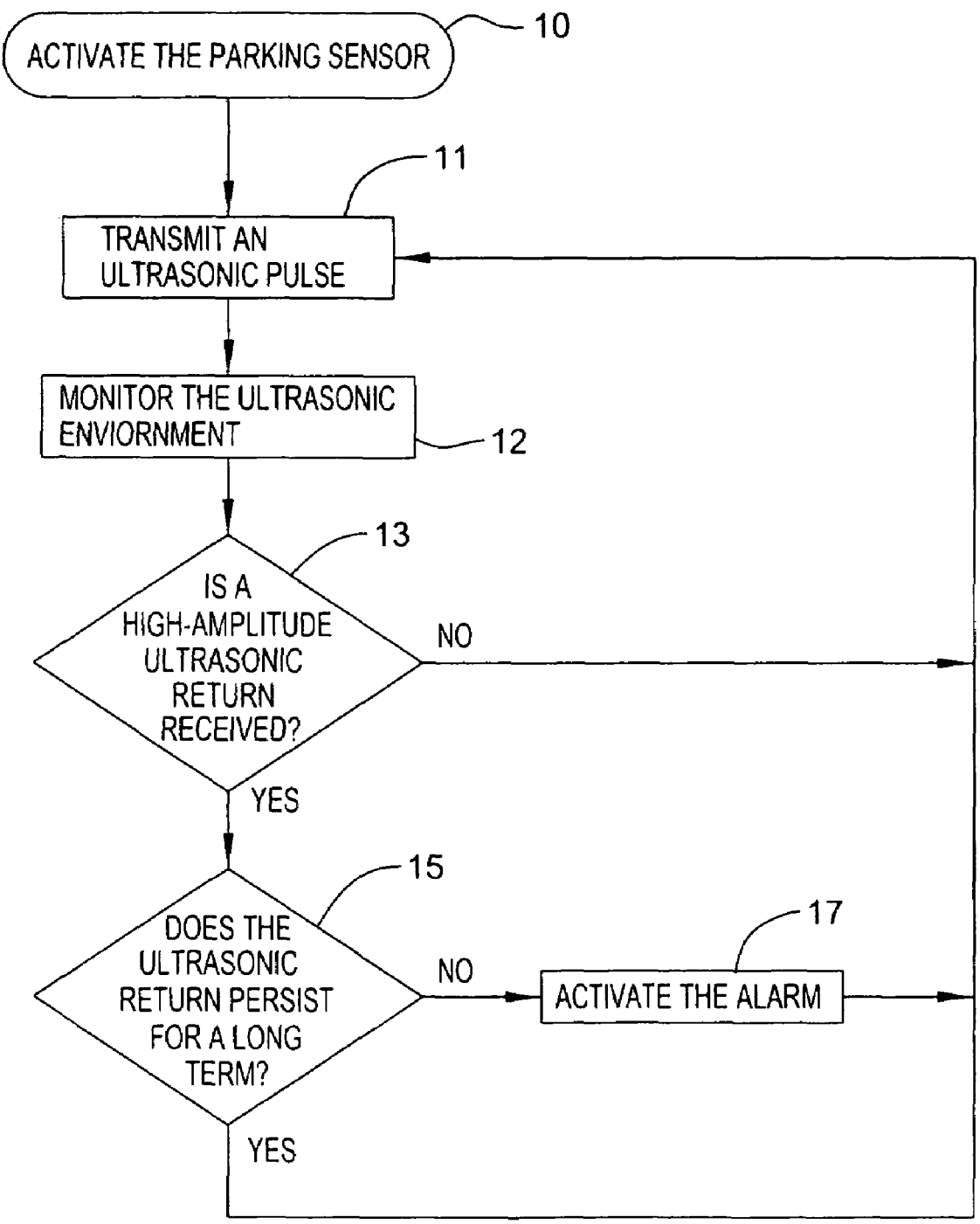
FIG. 1 is a logic diagram of a first embodiment of a parking sensor method to keep air brakes from interfering with the parking sensor apparatus in accordance with the present invention.
Figure 2:
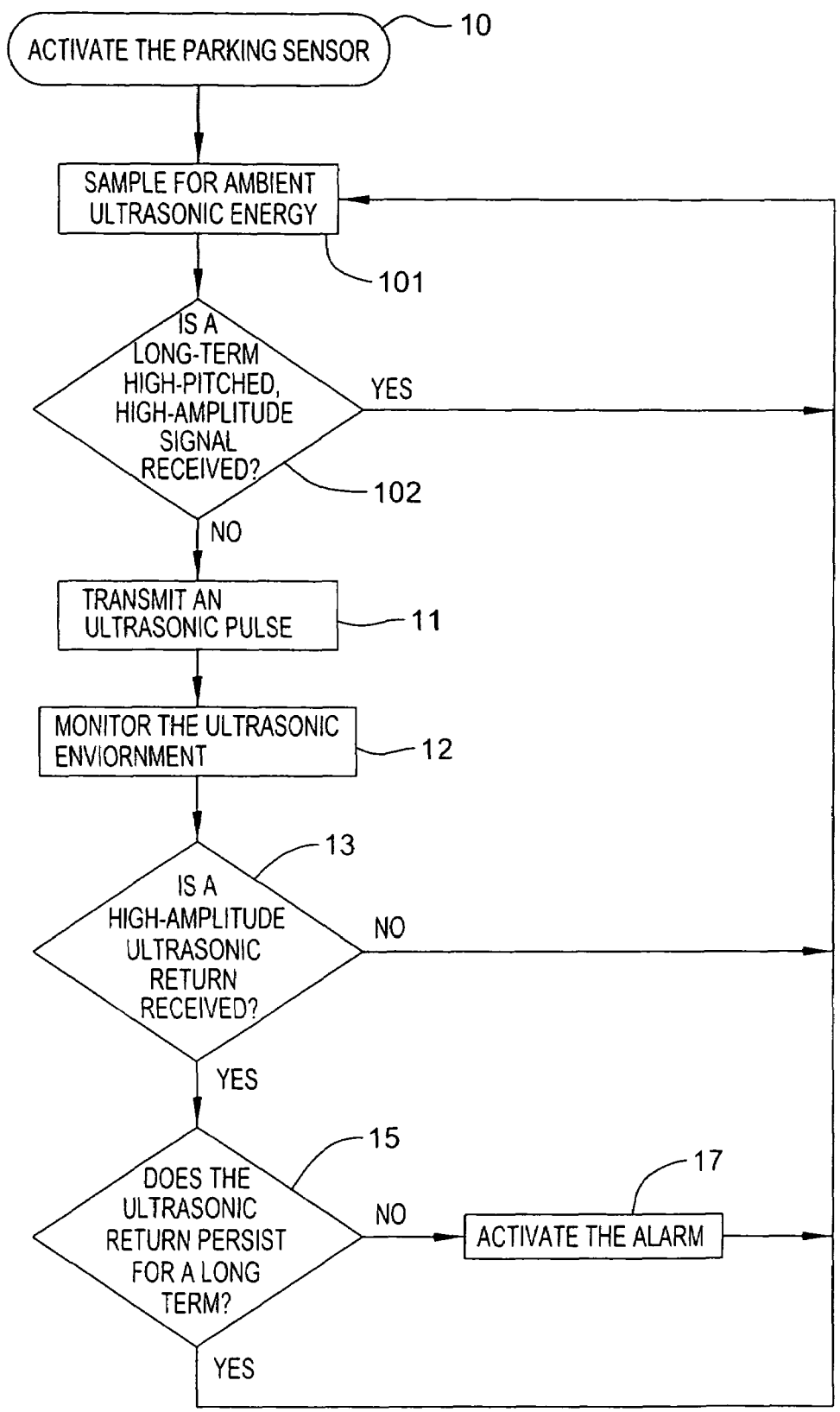
FIG. 2 is a logic diagram of a second embodiment of a parking sensor method to keep air brakes from interfering with the parking sensor apparatus in accordance with the present invention.

With reference to FIGS. 1 and 2, a parking sensor method in accordance with the present invention comprises the steps of activating the parking sensor (10), optionally sampling for ambient ultrasonic energy (101), optionally determining if long-term (about 10 ms), high-pitched (about being equal to 85% peek voltage of power divided by 100 μs), high-amplitude (over than 85% peek voltage of the power) noise exists (102), transmitting an ultrasonic pulse (11), monitoring the ultrasonic environment (12), determining if a high-amplitude return exists (13), repeating the previous three steps (11, 12, 13) until a high-amplitude return is detected, determining if the high-amplitude return is long-term (15), activating the alarm (17) if the high-amplitude response is not long-term and repeating the process starting with transmitting an ultrasonic pulse (11).

In a second embodiment of the parking sensor method in accordance with the present invention, the step of sampling for ambient ultrasonic energy (101) is performed immediately after activating the parking sensor apparatus (10) to determine if high-pitched, high-amplitude noise exists so the parking sensor apparatus will not mistakenly activate an alarm. This step is performed by placing the ultrasonic transducer in a receive mode for a predetermined duration. The predetermined duration must be longer than a single pulse width and may be as long as one or more cycles of the parking sensor apparatus.

Determining if long-term, high-amplitude noise exists is performed by analyzing energy received through the transducer, and the previous step is repeated when long-term, high-amplitude noise exists. For example, the long-term should be about 10 ms and the high-amplitude should be over 85% amplitude of the power voltage supplied to the parking sensor apparatus.

Transmitting the ultrasonic pulse (11) comprises having a transmitter transmit a single short burst of ultrasonic energy from the ultrasonic transducer in the parking sensor apparatus.

Monitoring the ultrasonic environment comprises having the transducer listen for an ultrasonic return.

Determining if a high-amplitude return exists (13) comprises having the transducer send received energy to the receiver that converts the energy to an electronic signal that is further converted by the analog to digital converter so the microprocessor can process the signal to determine if the received energy is large enough to be an echo. If not, another pulse is transmitted.

Determining if the high-amplitude return is long-term (15) is further processing of the return by the microprocessor and determining whether a return is noise or an echo. If the return persists for a long term, the return is air brake noise, and another pulse is transmitted. If the return does not persist, the return is an echo from an obstacle.

Activating the alarm (17) is performed when a return is determined to be an echo from an obstacle, and another pulse is transmitted.

The method described detects air brake noise and prevents the alarm device from emitting a false alarm. The invention allows a parking sensor apparatus to be used on vehicles with air brakes.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A parking sensor apparatus to keep air brakes from interfering with the parking sensor apparatus, the parking sensor apparatus comprising a microprocessor processing signals received by the parking sensor apparatus to determine whether the signals are reflected echoes or ultrasonic air brake noise;

a memory device connected to the microprocessor and storing operational parameters and data;

an ultrasonic transducer transmitting and receiving ultrasonic energy;

an ultrasonic receiver connected to the ultrasonic transducer and transforming ultrasonic energy received by the ultrasonic transducer to an analog electronic signal;

an analog to digital converter connected between the ultrasonic receiver and the microprocessor and converting the analog electronic signal from the ultrasonic receiver to a digital electronic signal used and processed by the microprocessor to determine whether the ultrasonic energy received by the ultrasonic transducer is a reflected echo or ultrasonic air brake noise;

an ultrasonic transmitter connected between the microprocessor and the ultrasonic transducer to cause the ultrasonic transducer to emit an ultrasonic pulse; and an alarm device connected to and driven by the microprocessor to emit a warning when the microprocessor determines that the ultrasonic energy received by the ultrasonic transducer is a reflected echo.

2. The parking sensor apparatus as claimed in claim 1, wherein the warning emitted by the alarm device is an audible warning.

3. The parking sensor apparatus as claimed in claim 1, wherein the warning emitted by the alarm device is a visual warning.

4. The parking sensor apparatus as claimed in claim 1, wherein the warning emitted by the alarm device is an audible warning and a visual warning.

5. A parking sensor method to keep air brakes from interfering with a parking sensor apparatus, the parking sensor method comprising activating the parking sensor apparatus;

transmitting an ultrasonic pulse by a transmitter transmitting a short burst of ultrasonic energy from an ultrasonic transducer;

monitoring an ultrasonic environment performed by a transducer listening for an ultrasonic return;

determining if a high-amplitude return exists comprises having the transducer send received energy to a receiver that converts the energy to an electronic signal that is further converted by an analog to digital converter so a microprocessor processes the signal to determine if the received energy is large enough to be an echo;

repeating the previous three steps if no high-amplitude return exists;

determining if the high-amplitude return is long-term;

activating an alarm if the high-amplitude response is not long-term; and repeating the process starting with transmitting an ultrasonic pulse.

6. The parking sensor method claimed in claim 5 further comprising after activating the parking sensor apparatus, sampling for ambient ultrasonic energy to determine if high-pitched, high-amplitude noise exists so the parking sensor apparatus will not mistakenly activate the alarm; and wherein determining if long-term, high-amplitude noise exists is performed by analyzing energy received through the transducer and repeats sampling for ambient ultrasonic energy to determine when long-term, high-amplitude noise exists.

* * * * *